Patented Apr. 1, 1947

2,418,435

UNITED STATES PATENT OFFICE 2,418,435

BRAKE

Carl E. Tack, Chicago, Ill., assignor to American Steel Foundries, Chicago, Ill., a corporation of New Jersey Application May 1, 1943, Serial No. 485,275

26 Claims. (Cl. 188—33)

1

My invention relates to brakes and more particularly to brake rigging adapted to be associated with a railway car truck.

The principal object of my invention is to design a brake rigging of the above-described type in which each wheel and axle assembly may be braked by metal to metal friction means and by metal to composition friction means in what may be termed a "duplex" or "duo-simplex" arrangement.

A characteristic or well known phenomenon peculiar to composition brake lining is a lowering of the friction co-efficient as the speed of the braked member decreases. In other words, when composition brake lining is utilized the co-efficient of friction is reduced as the speed approaches zero and this fade, as it is commonly described, is considered particularly undesirable for railway use since it makes it difficult accurately to stop a train and, moreover, it tends to lengthen a stop at the most critical point of an emergency. The contrary is true of metal to metal braking surfaces such as are more commonly used on railway equipment at the present time. In other words, the co-efficient of friction for metal to metal contact rises as the speed is reduced and this at times tends to cause the brake shoes to "seize" the wheels, thus causing wheel slippage with respect to the rails unless the braking pressure is reduced somewhat with reduction of speed. I have conceived the desirability of utilizing in conjunction the two types of braking surfaces in order to secure the advantages of both and at the same time to eliminate, to a degree at least, the disadvantages which normally accompany the use of either alone. By this means I am able to produce a relatively smooth torque curve as compared with the torque curve which will be produced in utilizing either of the above types of brake by itself.

A further object of my invention, therefore, is to devise a novel form of brake arrangement utilizing metal to metal friction surfaces in conjunction with metal to composition braking surfaces in order to secure the advantages of both types of brakes and to eliminate the disadvantages associated with each, when used separately.

I accomplish the above-mentioned objects by associating with each wheel and axle assembly a substantially C-shaped brake frame or yoke supported at the ends thereof from the journal boxes of said assembly and supported intermediate said ends from the truck frame, said yoke carrying composition friction means for engagement with an iron or steel disc mounted to rotate with the assembly. At the same time, I provide a novel clasp brake arrangement in which truck levers are supported from the truck frame at opposite sides of each wheel and carry iron friction shoes for engagement with the periphery thereof, said truck levers being actuated by a novel system of interconnected pull rods and levers, the brake yoke being offset adjacent each end thereof to provide a space therein in which the adjacent truck levers may rotate during actuation of the clasp brake mechanism.

The design and support of the above-mentioned disc brake mechanism is of the generic type disclosed in my co-pending application Serial No. 421,418, Patent No. 2,355,120, August 8, 1944, and will not therefore be described in detail in the present application except for the improvements over and above those disclosed in said co-pending application.

A further object of my invention is to design a novel clasp brake mechanism for a railway car truck in which dead truck levers are fulcrumed at opposite sides of each wheel, said truck levers being actuated by means of interconnected live and dead auxiliary levers connected to respective of the truck levers, each of said live auxiliary levers being afforded an operative connection with an associated live or dead cylinder lever actuated by means of a power cylinder mounted on the truck frame in what is generally termed a unit cylinder arrangement.

In the drawings, Figure 1 is a top plan view of a railway car truck embodying my invention.

Figure 4:
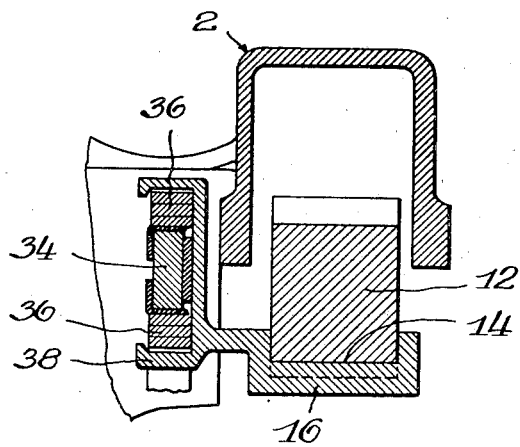
Figure 4 is a fragmentary sectional view taken in the transverse vertical plane indicated by the line 4—4 of Figure 2 and showing the support for one end of the disc brake yoke.

Describing my invention in detail, the truck frame generally indicated 2 comprises spaced side rails 4, 4 joined at each end thereof by an end rail 6 and joined intermediate the ends thereof by spaced transoms 8, 8 between which a bolster may be suspended in the customary manner. The frame 2 is supported at each side thereof by spring groups 10, 10 mounted on an equalizer 12 adjacent opposite ends thereof, said equalizer being seated at 14 (Figure 4) at each end thereof on an equalizer seat 16 mounted on the adjacent journal box 18 of one of the spaced wheel and axle assemblies 20, 20.

Figure 2:
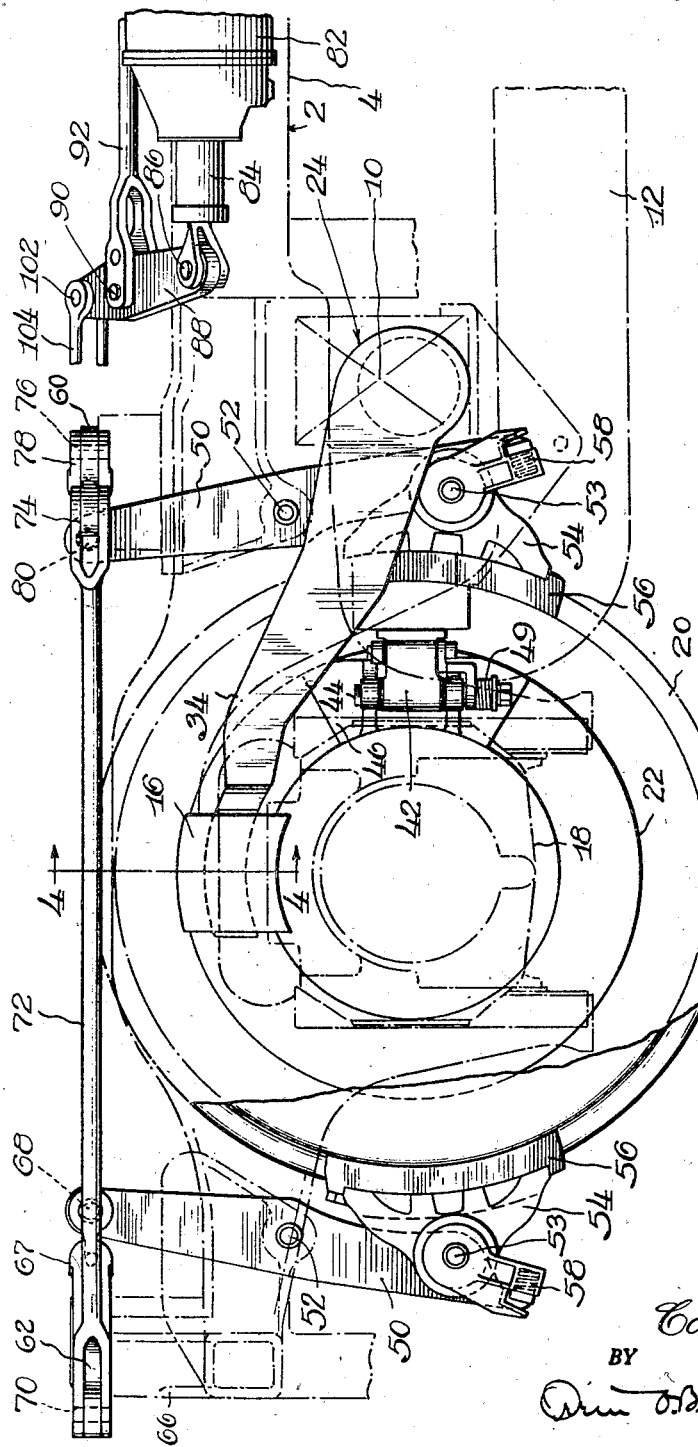
Figure 2 is a fragmentary side elevation of the truck shown in Figure 1, only one end of the truck being shown in this view inasmuch as the brake arrangement is similar at opposite ends thereof.
Figure 3:
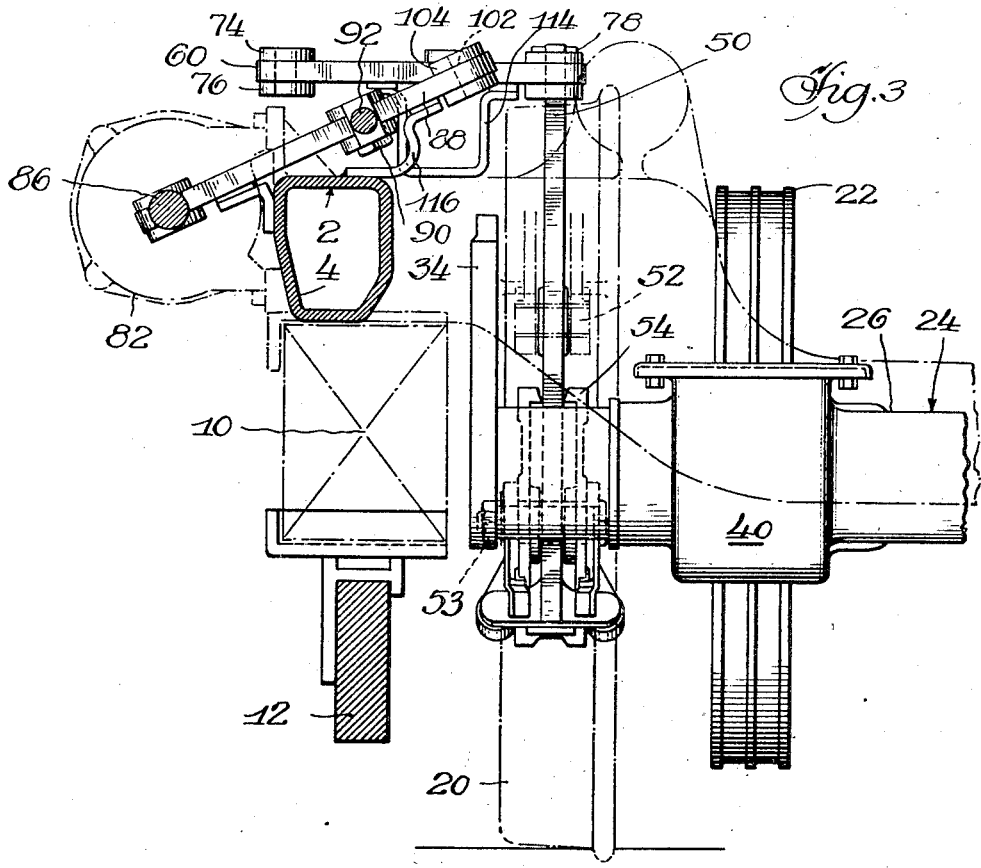
Figure 3 is a fragmentary sectional view taken in the transverse vertical plane indicated by the line 3—3 of Figure 1.

A disc or rotor 22 is driven by each assembly adjacent each end thereof and a brake frame or yoke 24 is associated with each assembly, said yoke being generally C-shaped in plan view and comprising a transverse member 26 (Figure 3) comprising intermediate the ends thereof spaced arms 28, 28 pivotally connected at 30 to a bracket 32 on the adjacent transom 8. At opposite ends thereof the member 26 is provided with torque arms 34, 34, each arm being clamped at its extremity between resilient means 36, 36 (Figure 4) mounted within a jaw 38 on the adjacent equalizer seat 16. A cylinder housing 40 is formed on the yoke 24 adjacent each disc 22, said housing containing actuating means for brake levers 42, 42 pivotally fulcrumed therein and connected at 44, 44 to brake heads 46, 46 supporting brake shoes 48, 48 for engagement with opposite sides of the disc 22. It will be understood that the shoes 48, 48 are preferably formed of composition brake material. Each of the brake heads 46, 46 is formed with balancing means 49 (Figure 2) of the form shown and described in detail in my co-pending application Serial No. 448,373, Patent No. 2,380,803, July 31, 1945.

Clasp brake means for the wheels at each side of the truck frame is provided by a pair of dead truck levers 50, 50 at opposite sides of each wheel, said levers being fulcrumed intermediate their ends at 52, 52 respectively from brackets on the truck frame 2. Each lever 50 pivotally supports at 53 (Figure 2) a brake head 54 carrying a brake shoe 56 for engagement with the adjacent side of the wheel, each of said heads 54, 54 being provided with balancing means 58 of well known form.

Live and dead auxiliary levers 60 and 62, respectively, are associated with each pair of dead truck levers 50, 50, the dead auxiliary lever 62 being pivotally fulcrumed at 64 from a bracket 66 (Figure 2) on the truck frame 2 adjacent the juncture of the side rail 4 with the end rail 6. The inboard end of the dead auxiliary lever 62 is pivotally connected at 65 to clevis means 67 afforded a pivotal connection at 68 to the upper end of the adjacent truck lever 50, and the outboard end of the dead auxiliary lever 62 is pivotally connected at 70 to a pull rod 72, said pull rod being connected at the opposite end thereof at 74 to the outboard end of the live auxiliary lever 60, the inboard end of which is pivotally connected at 76 to clevis means 78 pivotally connected at 80 to the upper end of the adjacent truck lever 50.

A power cylinder 82 is mounted on each side rail 4, and the piston rod 84 projecting from one end of said cylinder is pivotally connected at 86 to the lower outboard end of the diagonally arranged live cylinder lever 88, said cylinder lever being pivotally and adjustably connected at 90 to one end of the pull rod 92, the opposite end of which is pivotally and adjustably connected at 94 to the diagonal dead cylinder lever 96 intermediate the ends thereof, the lower outboard end of the lever 96 being pivotally connected at 98 to the automatic slack adjuster means 100 mounted on the power cylinder 82 in the customary manner. The upper inboard end of the live cylinder lever 88 is pivotally connected at 102 to the clevis means 104 which is pivotally connected at 106 to the adjacent live auxiliary lever 60 intermediate the ends thereof, and the upper inboard end of the dead cylinder lever 96 is pivotally connected at 108 to the clevis means 110 which is pivotally connected at 112 to the adjacent live auxiliary lever 60 intermediate the ends thereof.

It may be noted that the live auxiliary levers 60, 60 are afforded slidable support by means of brackets 114, 114 mounted on the side rail 4 and the live and dead cylinder levers 88 and 96 are slidably supported by means of brackets 116, 116 on the side rail.

Figure 1:
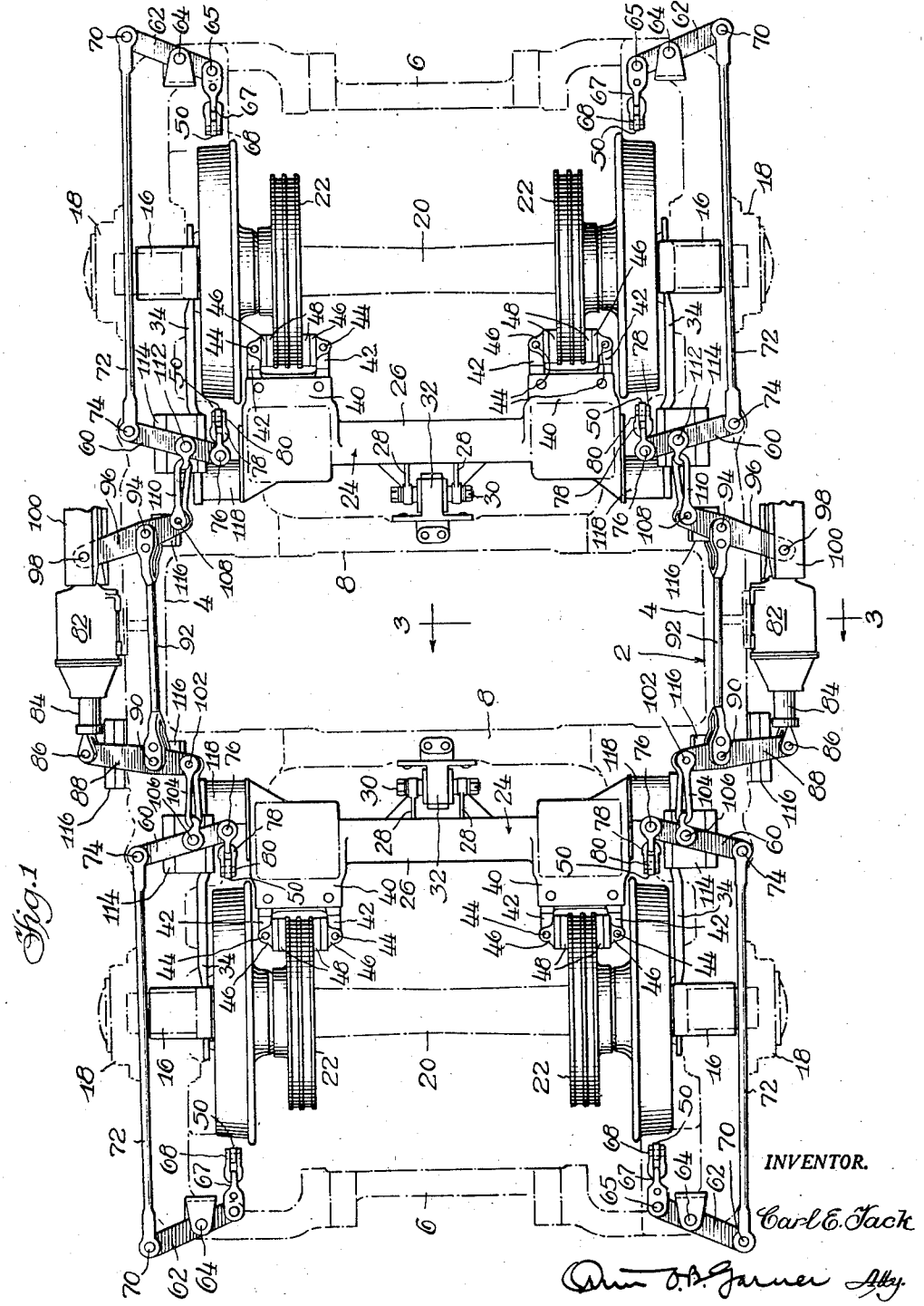

As may best be seen in Figure 1, the transverse member 26 of the brake yoke 24 is offset at 118 adjacent its juncture with each torque arm 34 in such manner that the torque arm, the offset portion of the member 26 and the side of the adjacent cylinder housing 40 form a slot within which the adjacent dead truck lever 50 may rotate during actuation thereof.

It will be understood that in the operation of my novel brake arrangement, the piston rod 84 at the bottom of Figure 1 will move to the left, whereby the live cylinder lever 88 will rotate in a clockwise direction about the pivot point 90 and at the same time the dead cylinder lever 96 will rotate in a counterclockwise direction about the pivot point 98, each of said cylinder levers through its connection to the adjacent auxiliary lever 60 functioning to actuate the associated truck levers 50, 50 adjacent one end of the truck. At the same time, by means of any suitable actuating mechanism within the housings 40, 40, the brake levers 42, 42 will be actuated to urge the brake shoes 48, 48 into engagement with the brake discs 22, 22. Inasmuch as the brake shoes 48, 48 are preferably of composition friction material whereas the shoes 56, 56 as well as the brake discs 22, 22 and the wheels of the wheel and axle assemblies 20, 20 are of iron or steel, I thus am enabled to attain a combination of the torque characteristics of metal to composition braking surfaces and metal to metal braking surfaces. It will be understood that in the event that either the disc brake or clasp brake mechanism should become inoperative for some reason, the other of said mechanisms will be effective to brake the truck.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a brake arrangement, a vehicle frame, spaced supporting wheel and axle assemblies each comprising an axle with wheels thereon and journal boxes on said axle outboard the respective wheels, a plurality of brake rotors driven by each assembly, a substantially C-shaped brake yoke adjacent each assembly and comprising a transverse member supported from the vehicle frame and longitudinally extending torque arms supported from respective journal boxes, friction means mounted on said yoke for braking the associated rotors, and brake rigging for each side of said vehicle comprising dead truck levers fulcrumed from said frame at opposite sides of each wheel, interconnected live and dead auxiliary levers connected to respective of said truck levers, a power cylinder on said frame, and interconnected live and dead cylinder levers connected at their outboard ends to opposite ends of said cylinder and connected at their inboard ends to respective of said live auxiliary levers, each of said transverse members being offset adjacent its juncture with the associated torque arms to define therewith slots for the reception of the associated dead truck levers.

2. In a brake arrangement, a vehicle frame, spaced supporting wheel and axle assemblies each comprising an axle with wheels thereon and journal boxes outboard the respective wheels, a brake rotor driven by each assembly, a substantially C-shaped brake yoke associated with each assembly and supported from the journal boxes associated therewith and from said vehicle frame, friction means mounted on said yoke for braking the associated rotor, and brake rigging for each side of said vehicle comprising dead truck levers fulcrumed from said frame at opposite sides of each wheel, interconnected live and dead auxiliary levers connected to respective of said truck levers, a power cylinder on said frame, and interconnected diagonal live and dead cylinder levers connected at their lower outboard ends to opposite ends of said cylinder and connected at their upper inboard ends to respective of said live auxiliary levers, said brake yokes being offset adjacent opposite ends thereof to afford clearance for the adjacent dead truck levers.

3. In a brake arrangement, a vehicle frame, spaced supporting wheel and axle assemblies each comprising an axle with wheels thereon and journal boxes on said axle outboard the respective wheels, a brake rotor driven by each assembly, a substantially C-shaped brake yoke associated with each assembly and supported from the journal boxes associated therewith and from said vehicle frame, friction means mounted on said yoke for braking the associated rotor, and brake rigging for each side of said vehicle comprising dead truck levers fulcrumed from said frame at opposite sides of each wheel, interconnected live and dead auxiliary levers connected to respective of said truck levers, a power cylinder on said frame, and interconnected live and dead cylinder levers connected at their outboard ends to opposite ends of said cylinder and connected at their inboard ends to respective of said live auxiliary levers, said brake yokes being offset adjacent opposite ends thereof to afford clearance for the adjacent dead truck levers.

4. In a brake arrangement, a vehicle frame, spaced supporting wheel and axle assemblies each comprising an axle with wheels thereon and journal boxes on said axle outboard the respective wheels, a brake rotor driven by each assembly, a substantially C-shaped brake yoke adjacent each assembly and supported from the journal boxes associated therewith and from said vehicle frame, friction means mounted on said yoke for braking the associated rotor, and brake rigging for each side of said vehicle comprising dead truck levers at opposite sides of each wheel and fulcrumed intermediate their ends from said vehicle frame, interconnected live and dead auxiliary levers connected to respective of said truck levers, a power cylinder on said frame, and interconnected live and dead cylinder levers connected at their outboard ends to opposite ends of said cylinder and connected at their inboard ends to respective of said live auxiliary levers, said brake yokes being offset adjacent opposite ends thereof to afford clearance for the adjacent dead truck levers.

5. In a brake arrangement, a vehicle frame, a supporting wheel and axle assembly comprising an axle with a wheel thereon and a journal box outboard said wheel, a disc driven by said assembly, a brake yoke comprising a transversely extending member supported from said frame and a longitudinally extending member supported from said box, friction means on said yoke for engagement with said disc, dead truck levers fulcrumed from said frame at opposite sides of said wheel, friction means associated with said levers and actuated thereby into engagement with said wheel, interconnected live and dead auxiliary levers supported from said frame and connected to respective truck levers, power means on said frame, and an operative connection between said power means and said live auxiliary lever, said brake frame being offset adjacent the juncture between said transversely and longitudinally extending members to afford clearance for the adjacent dead truck lever.

6. In a brake arrangement, a vehicle frame, a supporting wheel and axle assembly comprising an axle with a wheel thereon and a journal box outboard said wheel, a disc driven by said assembly, a brake yoke comprising a transversely extending member supported from said frame, and a longitudinally extending member supported from said box, friction means on said yoke for engagement with said disc, dead truck levers fulcrumed from said frame at opposite sides of said wheel, friction means associated with said levers and actuated thereby into engagement with said wheel, interconnected live and dead auxiliary levers supported from said frame and connected to respective truck levers, said brake frame being offset adjacent the juncture between said transversely and longitudinally extending members to afford clearance for the adjacent dead truck lever, and power means associated with said live auxiliary lever.

7. In a brake arrangement, a vehicle frame, a supporting wheel and axle assembly comprising an axle with a wheel thereon and a journal box outboard said wheel, a brake disc driven by said assembly, a brake yoke comprising a transversely extending member supported from said frame and a longitudinally extending member supported from said box, friction means on said yoke for engagement with said disc, truck levers supported from said frame at opposite sides of said wheel, friction means associated with said levers and actuated thereby into engagement with said wheel, and actuating means associated with said levers, said transversely extending member being offset adjacent its juncture with said longitudinally extending member to define therewith a slot for the reception of the adjacent truck lever.

8. In a brake arrangement, a vehicle frame, spaced supporting wheel and axle assemblies each comprising an axle with wheels thereon, and brake rigging comprising dead truck levers fulcrumed from said frame at opposite sides of each wheel, interconnected live and dead auxiliary levers connected to respective of said truck levers, and power means operatively associated with said live auxiliary levers, said power means comprising a power cylinder mounted on said frame, interconnected live and dead cylinder levers having inboard and outboard ends and connected at their outboard ends to opposite ends of said cylinder, and an operative connection between the inboard ends of said cylinder levers and respective of said live auxiliary levers.

9. In a brake arrangement, a vehicle frame, spaced supporting wheel and axle assemblies each comprising an axle with wheels thereon and journal boxes outboard the respective wheels, a brake rotor driven by each assembly, a substantially C-shaped brake yoke associated with each assembly, and supported from the journal boxes associated therewith and from said vehicle frame, friction means mounted on said yoke for braking the associated rotor, and brake rigging for each side of said vehicle comprising truck levers supported from said frame at opposite sides of each wheel, and actuating means associated with said truck levers, said brake yokes being offset adjacent opposite ends thereof to afford clearance for the adjacent dead truck levers.

10. In a brake arrangement, a vehicle frame, a supporting wheel and axle assembly comprising spaced wheels and an axle, journal means on said axle outboard said wheels, a substantially C-shaped brake yoke supported at the ends thereof from said journal means and supported intermediate said ends from said frame, a brake disc driven by said assembly, friction means on said yoke for braking said disc, a truck lever supported from said frame and actuating friction means for engagement with each wheel, and an offset portion in said yoke adjacent each truck lever to afford clearance therefor.

11. In a brake arrangement, a vehicle frame, spaced supporting wheel and axle assemblies, dead truck levers supported from said frame at opposite sides of each wheel, and actuating means for the levers associated with each wheel, said actuating means comprising a dead auxiliary lever fulcrumed intermediate its ends from said frame, a live auxiliary lever, a connection between the outboard ends of said auxiliary levers, a connection between the inboard end of each of said auxiliary levers and the adjacent dead truck lever, interconnected live and dead cylinder levers connected respectively to the live auxiliary levers associated with respective wheels, and a power cylinder device connected between said cylinder levers.

12. In a brake arrangement, a vehicle frame, spaced supporting wheel and axle assemblies, and brake rigging comprising dead truck levers fulcrumed from said frame at opposite sides of each wheel, interconnected live and dead auxiliary levers connected to respective of said truck levers, a power cylinder on said frame, and interconnected diagonal live and dead cylinder levers connected at their outboard ends to opposite ends of said cylinder and connected at their inboard ends to respective of said live auxiliary levers.

13. In a brake arrangement, a vehicle frame, spaced supporting wheel and axle assemblies, and brake rigging comprising dead truck levers at opposite sides of each wheel, interconnected live and dead auxiliary levers connected to respective of said truck levers, power means on said frame, interconnected substantially horizontal live and dead cylinder levers connected to opposite ends of said power means, and an operative connection between each cylinder lever and the adjacent live auxiliary lever.

14. In a brake arrangement, a vehicle frame, a supporting axle with a wheel thereon, dead levers at opposite sides of said wheel, live and dead auxiliary levers operatively connected to respective of said dead levers, and power means operatively associated with the live auxiliary lever, said power means comprising a cylinder on said frame, a cylinder lever disposed above said frame and connected to said cylinder, an operative connection between said cylinder lever and said live auxiliary lever, an automatic slack adjuster device spaced from said dead auxiliary lever, and a connection between said device and said cylinder lever.

15. In a brake arrangement, a vehicle frame, spaced supporting wheel and axle assemblies each comprising an axle with wheels thereon, and brake riging comprising dead truck levers fulcrumed from said frame at opposite sides of each wheel, interconnected live and dead auxiliary levers disposed above said frame and connected to respective of said truck levers, power means disposed substantially at the transverse center line of said frame and operatively associated with said live auxiliary levers, an automatic slack adjuster device spaced from said dead auxiliary levers, and means connecting said device to the live auxiliary levers.

16. In a brake arrangement, a vehicle frame, spaced supporting wheel and axle assemblies, dead truck levers supported intermediate the ends thereof from said frame at opposite sides of each wheel, and actuating means for the levers associated with each wheel, said actuating means comprising interconnected live and dead auxiliary levers connected to respective of said truck levers and power means operatively associated with the live auxiliary lever, said power means being disposed intermediate the live auxiliary levers associated with respective wheels.

17. In a brake arrangement, a vehicle frame, spaced supporting wheel and axle assemblies, dead truck levers supported from said frame at opposite sides of each wheel, and actuating means for the levers associated with each wheel, said actuating means including a power cylinder device on said frame and levers disposed above said frame and operatively associated with said device and said truck levers, said device being disposed substantially at the transverse center line of the frame.

18. In a brake arrangement, a vehicle frame, a supporting axle with a wheel thereon, dead levers supported intermediate the ends thereof from said frame and at opposite sides of said wheel, live and dead auxiliary levers operatively connected to respective of said dead levers, and power means operatively associated with the live auxiliary lever, said power means including a cylinder lever connected to the live auxiliary lever, a cylinder device operatively connected to said cylinder lever, and an automatic slack adjuster device mounted on said cylinder device and connected to said cylinder lever.

19. In a brake arrangement for a railway car truck comprising a truck frame and a supporting wheel and axle assembly including spaced wheels and a rotatable brake surface therebetween, the combination of a substantially C-shaped brake frame comprising a member connected to the truck frame and extending transversely of the truck, and torque arms projecting angularly from said member and supported from said assembly, said member being offset adjacent its juncture with each arm to define therewith a slot in the plane of the adjacent wheel, a truck lever supported from said truck frame in each slot, friction means on said truck levers for engagement with the peripheries of respective wheels, brake means carried by said brake frame for cooperation with said surface, and actuating means for said truck levers.

20. In a brake arrangement for a railway car truck comprising a truck frame and a supporting wheel and axle assembly including spaced wheels and a rotatable brake surface therebetween, the combination of a substantially C- shaped brake frame comprising a member connected to the truck frame and extending transversely of the truck, and torque arms projecting angularly from said member and supported from said assembly, said member being offset adjacent its juncture with each arm to define therewith a slot in the plane of the adjacent wheel, a truck lever supported from said truck frame in each slot, friction means on said truck levers for engagement with the peripheries of respective wheels, brake means carried by said brake frame for cooperation with said surface, and actuating means for said truck levers, said actuating means including a power cylinder device mounted on each side of the truck frame, and an operative connection between each device and the adjacent truck lever.

21. In a brake arrangement for a vehicle comprising a vehicle frame and a supporting wheel and axle assembly including a brake surface substantially radial to the axis thereof, and a wheel with a peripheral brake surface, the combination of a brake frame including a member extending transversely of the vehicle and supported therefrom, and a torque arm projecting angularly from said member and supported from the vehicle adjacent the extremity of said assembly, said member being offset adjacent said arm to define therewith a slot disposed in the plane of said wheel, a brake lever supported from said vehicle within said slot, friction means on said lever for engagement with said peripheral surface, friction means carried by said brake frame for engagement with said radial surface, and actuating means for said brake lever.

22. In a brake arrangement for a railway car truck comprising a truck frame and spaced supporting wheel and axle assemblies, brake rigging comprising a power cylinder device mounted on said truck, interconnected live and dead cylinder levers above said frame and connected to opposite ends of said device, dead truck levers at opposite sides of each assembly, and an operative connection between each cylinder lever and the dead truck levers associated with one of said assemblies.

23. In a brake arrangement for a railway car truck comprising a truck frame and spaced supporting wheel and axle assemblies, brake rigging comprising a power cylinder device mounted on said truck, interconnected live and dead cylinder levers above said frame and connected to opposite ends of said device, dead truck levers at opposite sides of each assembly, and an operative connection between each cylinder lever and the dead truck levers associated with one of said assemblies, said operative connection comprising interconnected live and dead auxiliary levers each being connected to the adjacent truck lever, and means connecting the live auxiliary lever to the associated cylinder lever.

24. In a brake arrangement for a railway car truck comprising a truck frame and spaced supporting wheel and axle assemblies, brake rigging comprising a power cylinder device mounted on said truck, interconnected live and dead cylinder levers connected to opposite ends of said device, dead truck levers at opposite sides of each assembly, and an operative connection between each cylinder lever and the dead truck levers associated with one of said assemblies, said operative connection comprising substantially horizontal live and dead auxiliary levers each being connected at the inboard end thereof to the adjacent truck lever, means connecting the outboard ends of said auxiliary levers, and means connecting the live auxiliary lever to the associated cylinder lever.

25. In a brake arrangement for a vehicle comprising a frame and spaced supporting wheel and axle assemblies, clasp brake means associated with each wheel, interconnected live and dead auxiliary levers extending transversely of said frame and operatively associated with the clasp brake means for each wheel, a power cylinder device on said frame, interconnected live and dead cylinder levers connected to opposite ends of said device and extending inboard said frame, and an operative connection between the inboard end of each cylinder lever and the adjacent live auxiliary lever.

26. In a brake arrangement, a vehicle frame, spaced supporting wheel and axle assemblies, and brake rigging comprising dead substantially vertical levers at opposite sides of each wheel, interconnected live and dead auxiliary levers connected to respective of said vertical levers, interconnected live and dead cylinder levers extending inboard said frame, an operative connection between the inboard end of each cylinder lever and the adjacent live auxiliary lever, and a power cylinder device operatively connected to the live cylinder lever.

CARL E. TACK.

REFERENCES CITED

The following references are of record in the file of this patent:

UNITED STATES PATENTS

| Number | Name | Date |
|---|---|---|
| 2,237,509 | Tack | Apr. 8, 1941 |
| 2,238,744 | Mueller | Apr. 15, 1941 |
| 2,253,268 | Eksergian et al. | Aug. 19, 1941 |
| 2,284,484 | Eksergian | May 26, 1942 |
| 2,239,086 | Eksergian | Apr. 22, 1941 |
| 1,901,019 | Blunt | Mar. 14, 1933 |
| 1,998,976 | Baselt | Apr. 23, 1935 |